May 15, 1923. 1,455,719
W. C. F. DIETZ
WASHING MACHINE
Filed May 19, 1922 2 Sheets-Sheet 1
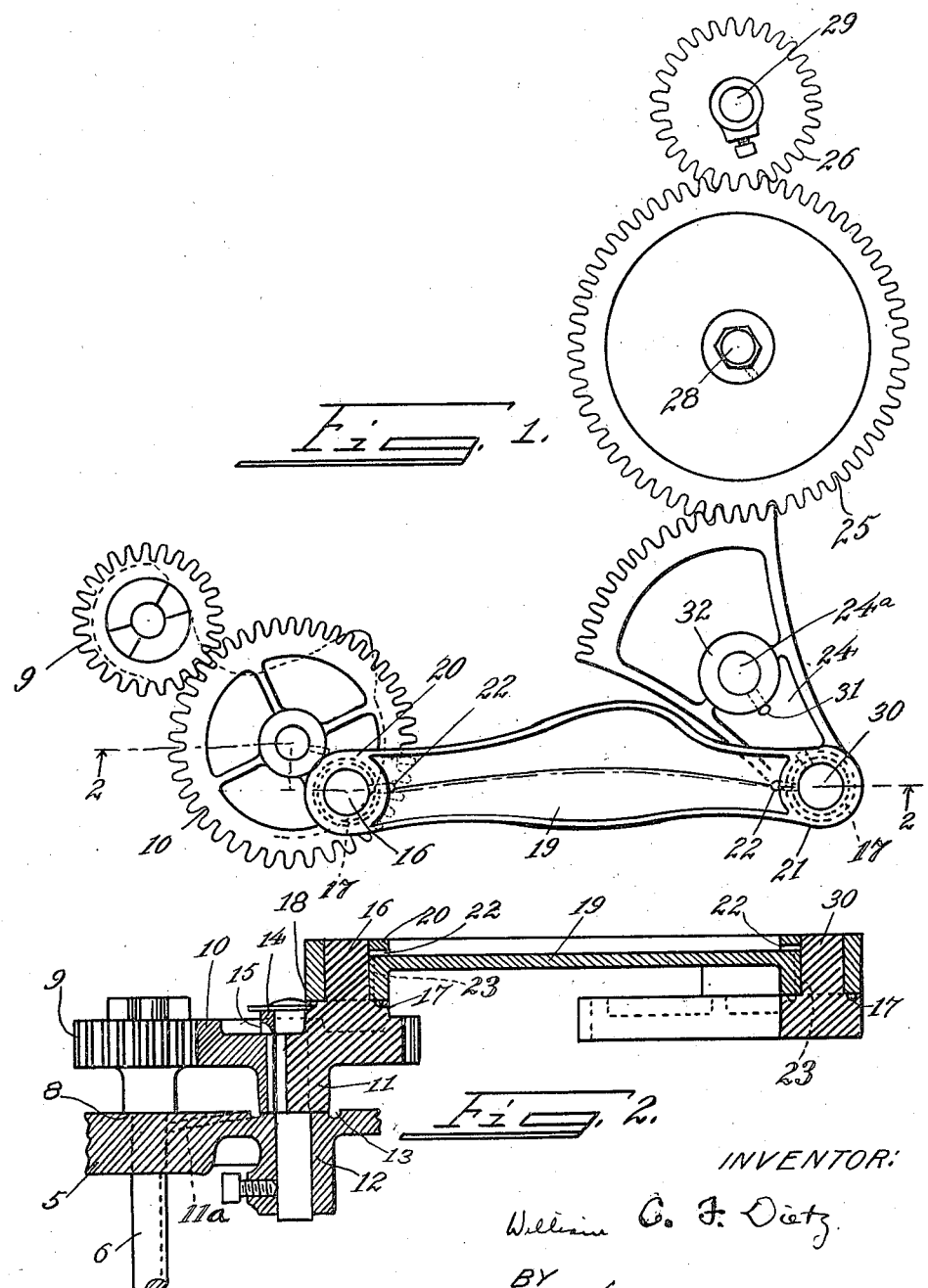

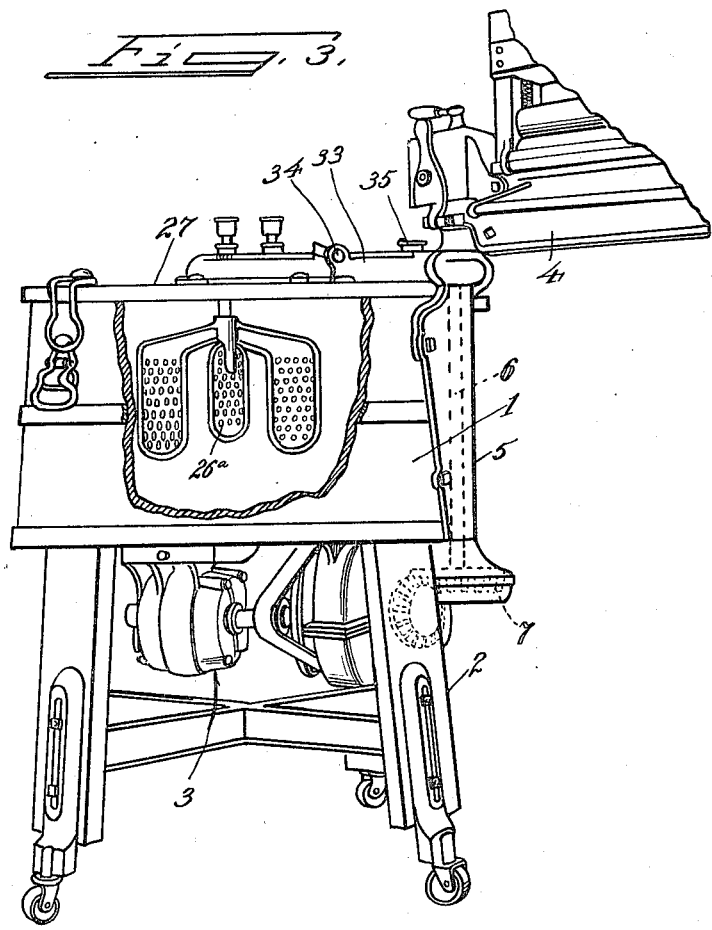

Patented May 15, 1923.

1,455,719

UNITED STATES PATENT OFFICE.

WILLIAM C. F. DIETZ, OF CINCINNATI, OHIO, ASSIGNOR TO THE BOSS WASHING MACHINE COMPANY, OF NORWOOD, OHIO, A CORPORATION OF OHIO.

WASHING MACHINE.

Application filed May 19, 1922. Serial No. 562,210.

*To all whom it may concern:*

Be it known that I, WILLIAM C. F. DIETZ, a citizen of the United States, and a resident of Cincinnati, in the county of Hamilton and State of Ohio, have invented certain new and useful Improvements in Washing Machines, of which the following is a full, clear, and exact description, reference being had to the accompanying drawings, forming part of this specification.

My invention relates specifically to washing machines, although it will be applicable to other classes of machinery.

The difficulty in connection with the operation of domestic machinery, such as washing machines, is that proper lubrication is not generally attended to, and where water has access to the various parts, good lubrication is necessary for preserving the bearings and keeping them in efficient performance.

It is the object of my invention to provide in connection with such machinery for lubricating devices which take a fluid oil from a common point and spread this oil to the proper points for lubrication of all adjacent bearings, thereby doing away with a multitude of grease cups and providing in addition, an oil reservoir which will continue to supply lubricant for a considerable length of time.

This object and attendant advantages I accomplish by that certain construction and arrangement of parts to be hereinafter more specifically pointed out and claimed.

In the drawings,

Figure 1 is a plan view of the drive gearing and the upper mechanism generally in a washing machine.

Figure 2 is a section on the line 2—2 of Figure 1.

Figure 3 is a perspective view, partly broken away, of a washing machine.

Referring first to the washing machine in general, it will be noted that the tub element 1 is supported on legs 2 and has a motor 3 for driving the mechanism in the tub and the wringer 4. A casing or housing 5 is mounted on the side of the tub, in which casing is supported a vertical shaft 6, having a beveled gear 7 at the lower end for driving it.

At the upper end of this shaft 6, the housing forms a bearing for it at 8. Above the bearing is mounted a gear 9, this gear being on the level of the top gearing.

A reduction gear 10 having a hub 11 is mounted in a bearing 12 formed by said housing. This bearing is formed with a channel 13 about the point of contact of the base of the hub 11 and a passage is formed as at 11$^a$ extending from this channel to the bearing 8.

The top of this gear 10 is depressed and the central boss 14 thereof has a hole 15 opening into the depressed surface of the gear and extending down through the hub to the base thereof.

Thus from the top of the gear 10 there is a channel to the bearing 12, and from the channel about the bearing 12 is a hole to the bearing 8.

The gear 10 has a crank pin 16 mounted thereon, said crank pin having a channel 17 formed about its base. This channel has one portion cut away, as at 18, to form a passage into the depressed top of the gear 10.

The drive of the usual clothes washer is an oscillating one, and this crank pin is used to drive a crank, which results in converting the rotary motion of the shaft 6 into oscillating motion.

This crank is in the form of a plate 19 cast with a central depression, the whole piece making up a V-shaped trough, terminating in the two sleeves 20, 21, which depend from the plate. Extending into the center of each sleeve is a port 22 leading from the base of the V-shaped depression in the crank plate, and each sleeve has a groove 23 running down its inner periphery.

Thus the sleeve lying over the pin 16 will carry oil from the crank plate along the bearing surface between the pin and sleeve, and this oil will flow into the channel about the pin and thence to the gears and bearings above mentioned.

There is a segment gear 24, which operates direct on the gear 25, which gear 25 drives the gear 26 of the "dolly" shaft. The "dolly" is shown at 26$^a$, and the two gears are mounted on fixed studs on the top plate 27 of the machine.

Thus there is the pin 24$^a$, which supports the segment gear 24, and the pins 28 and 29 which support the gears 25 and 26.

The segment is formed with a depressed upper face and is equipped with a crank pin 30, over which the sleeve 21 engages. Oil will thus pass from the crank plate through the sleeve 21 and about the pin 30. From this pin which has a channel at 17, it will flow over the surface of the segment, and a hole 31 is bored through the central boss 32 of this segment, thereby providing lubrication for the pin 28.

I have indicated at 33 a casing which is provided for the gearing, and crank devices on the lid or top plate of the washing machine. This casing provides the mounting for the pins 28 and 29, the portion of the casing that houses the gears 25 and 26 being hinged as at 34. However, the arrangement of the housing forms no particular point of my invention herein.

A port for oil is provided in the said casing, as indicated at 35, whereby the trough-like crank plate can be filled with oil. The crank plate has sufficient width to lie under this port at all positions thereof.

The passages have been noted as the description proceeded, whereby the oil flows to all of the bearings about the top of the machine, and it will be understood that by a groove in the shaft 6, the oil could be carried to the lower bearings thereof.

There is so large a natural reservoir for oil provided by the structure now described, that lubrication for a long time is provided. Not only this but the lubrication is of the most effective type and needs to be inserted at but one place. The gears in the hinged part of the upper casing will preferably be provided with grease cups in the usual way, due to the necessity of lifting them up in using the washing machine.

Having thus described my invention, what I claim as new and desire to secure by Letters Patent, is:—

1. In combination, a crank member formed with a trough on its upper face and sleeves at each end of the said member, and gears located in a horizontal plane and having pins for engagement with said sleeves, said sleeves having apertures leading into the trough, whereby the pins and sleeve bearings are lubricated and the gears formed with depressed upper faces and with hubs, said hubs having apertures leading into the said depressed faces, for the purpose described.

2. In combination, a gear having a depressed top, a hub for said gear and a supporting element for said gear, an oil hole from the depressed face of said gear into the hub, a channel formed in the supporting element about said hub, and a port from said channel in the supporting element to another point to be lubricated.

3. In combination, a gear, segment or the like, said gear having a depressed top, a wrist pin formed on said gear, a hub for said gear, an oil hole from the depressed face of said gear into the hub, a channel about the base of the pin, said channel having a port to the depressed surface of the gear, and means for oiling the pin, for the purpose described.

4. In combination, a gear, segment or the like, said gear having a depressed top, a wrist pin formed on said gear, a hub for said gear, an oil hole from the depressed face of said gear into the hub, a channel about the base of the pin, said channel having a port to the depressed surface of the gear, and means for oiling the pin, said means comprising a crank plate having a depressed surface, and a sleeve on said plate adapted to seat over the pin, and a port from the crank plate into said sleeve, for the purpose described.

5. A crank member for connecting two machine elements in a horizontal plane, said member formed with a trough on its upper face and sleeves at each end of the member, said sleeves having apertures extending into the base of the trough, for the purpose described, a casing in which said crank member is mounted, an oil hole in the casing, said crank member having a width sufficient to lie beneath the hole in all positions thereof.

WILLIAM C. F. DIETZ